United States Patent
Fangeat et al.

(10) Patent No.: US 7,426,431 B2
(45) Date of Patent: Sep. 16, 2008

(54) SYSTEM FOR CONTROLLING THE STABILITY OF A VEHICLE USING AN ALGORITHM ANALYZING THE VARIATION IN A REPRESENTATIVE PARAMETER OVER TIME

(75) Inventors: Nicolas Fangeat, Chamalieres (FR); Georges Levy, Tokyo (JP)

(73) Assignee: Michelin Recherche et Technique S.A., Granges-Paccot (CH)

( * ) Notice: Subject to any disclaimer, the term of this patent is extended or adjusted under 35 U.S.C. 154(b) by 605 days.

(21) Appl. No.: 11/038,750

(22) Filed: Jan. 18, 2005

(65) Prior Publication Data

US 2005/0184584 A1    Aug. 25, 2005

(30) Foreign Application Priority Data

Jan. 16, 2004 (FR) .................................. 04 00426
Jan. 16, 2004 (FR) .................................. 04 00428

(51) Int. Cl.
*G05B 13/02* (2006.01)
*B60T 8/00* (2006.01)

(52) U.S. Cl. ............................. 701/48; 701/71; 303/150
(58) Field of Classification Search ........................ None
See application file for complete search history.

(56) References Cited

U.S. PATENT DOCUMENTS

| | | | |
|---|---|---|---|
| 3,980,346 A | 9/1976 | Leiber | 303/6 |
| 4,715,662 A | 12/1987 | van Zanten et al. | 303/109 |
| 4,794,538 A | 12/1988 | Cao et al. | 701/74 |
| 5,343,918 A | 9/1994 | Fontaine | 152/209.5 |
| 5,365,443 A * | 11/1994 | Tsuyama et al. | 701/83 |
| 5,402,345 A | 3/1995 | Kost | 364/426.02 |
| 5,409,302 A | 4/1995 | Chabbert | 303/112 |
| 5,428,539 A * | 6/1995 | Kawamura et al. | 701/84 |

(Continued)

FOREIGN PATENT DOCUMENTS

DE    40 30 724 A1    2/1992

(Continued)

OTHER PUBLICATIONS

Grosch, K. A., "Determination of Friction and Wear Resistance of Tread Compounds—Part I: Wet Skid," Kautschuk and Gummi Kunststoffe, Jun. 1996, v49, n6, p. 432-441 (Abstract).

(Continued)

*Primary Examiner*—Michael J. Zanelli
(74) *Attorney, Agent, or Firm*—Fitzpatrick, Cella, Harper & Scinto

(57) ABSTRACT

Vehicle stability control system, the system including means for imparting a longitudinal force on the tire and means for calculating the slip parameter $G_{opt}$ at each activation of the means for imparting a longitudinal force on the tire in the following manner: as the values of $G_i$ are acquired, calculating the variation in G with respect to time, as long as the variation is above a low threshold, calculating coefficients $A_{[wet, p]}$ by direct calculation or by an appropriate regression so as to model variation in G with respect to time by a variation curve which is a function of $(G_i, A_{[wet, p]})$, as soon as the variation is greater than a high threshold, determining a target slip $G^{Cwet}$ using at least the last values of $A_{[wet, p]}$.

11 Claims, 3 Drawing Sheets

U.S. PATENT DOCUMENTS

| | | | |
|---|---|---|---|
| 5,513,907 A | 5/1996 | Kiencke et al. | 303/150 |
| 5,641,212 A | 6/1997 | Sakai | 303/147 |
| 5,809,445 A * | 9/1998 | Yamamoto et al. | 701/74 |
| 5,814,718 A | 9/1998 | Andresen et al. | 73/9 |
| 5,816,666 A | 10/1998 | Wiss | 303/113.4 |
| 6,015,192 A | 1/2000 | Fukumura | 303/140 |
| 6,092,415 A | 7/2000 | Borenius et al. | 73/146.2 |
| 6,233,505 B1 | 5/2001 | Kranz et al. | 701/1 |
| 6,285,280 B1 | 9/2001 | Wang | 340/444 |
| 6,418,369 B2 * | 7/2002 | Matsumoto et al. | 701/80 |
| 6,449,542 B1 | 9/2002 | Böttiger et al. | 701/41 |
| 6,550,320 B1 | 4/2003 | Giustino | 73/146 |
| 2002/0010537 A1 | 1/2002 | Yamaguchi et al. | 701/80 |
| 2002/0111752 A1 | 8/2002 | Nakamura | 702/42 |
| 2004/0024514 A1 | 2/2004 | Levy et al. | 701/82 |
| 2004/0032165 A1 | 2/2004 | Levy et al. | 303/150 |
| 2004/0049303 A1 | 3/2004 | Levy et al. | 700/80 |
| 2004/0225423 A1 | 11/2004 | Carlson et al. | 701/36 |

FOREIGN PATENT DOCUMENTS

| | | |
|---|---|---|
| DE | 42 18 034 A1 | 9/1993 |
| DE | 43 29 745 C1 | 7/1994 |
| DE | 44 35 448 A1 | 4/1995 |
| DE | 101 28 675 A1 | 1/2002 |
| DE | 101 56 823 A1 | 6/2002 |
| EP | 0 716 948 A2 | 6/1996 |
| EP | 0 829 401 A2 | 3/1998 |
| EP | 1 000 838 A2 | 5/2000 |
| EP | 1 371 534 A1 | 12/2003 |
| FR | 2816402 | 5/2002 |
| FR | 2 840 867 | 12/2003 |
| WO | WO 01/36240 A1 | 5/2001 |
| WO | WO 01/76925 | 10/2001 |
| WO | WO 01/87647 | 11/2001 |

OTHER PUBLICATIONS

Yamazaki Shun'ichi., "The Determination of Tire Parameter for Real Time Estimation of Tire and Road Friction," Jidosha Gijutsukai Koenkai Maezurishu, 1997, No. 971, p. 165-168 (Abstract).

Sakai Tomotsugu "Investigation of Lambourn Wear Test Conditions to Evaluate Tire Wear Life," Toyota Motor Corp., Proceedings of the International Sessions JSME Spring Annual Meeting, 1996, vol. 73, p. 33-34 (Abstract).

* cited by examiner

SYSTEM FOR CONTROLLING THE STABILITY OF A VEHICLE USING AN ALGORITHM ANALYZING THE VARIATION IN A REPRESENTATIVE PARAMETER OVER TIME

CROSS-REFERENCE TO RELATED APPLICATIONS

This application claims benefit of French Patent Application No. 04/00426, filed Jan. 16, 2004, and French Patent Application No. 04/00428, filed Jan. 16, 2004, both of which are incorporated herein by reference in their entirety.

BACKGROUND OF THE INVENTION

1. Field of the Invention

The present invention relates to vehicle stability control systems. In a particular application, the invention relates to systems aimed at preventing the locking of the wheels during hard braking, popularized by the term "ABS". More generally, the invention concerns all systems aimed at maintaining the vehicle on a stable path by acting automatically on actuators such as those determining a wheel driving or braking torque, or those determining the steering of one or more wheels, or even those concerning the suspension, where it is known that this also has an effect on the control of the path (for example active antiroll). In the particular application mentioned above, the actuators are the brakes on a wheel or the device imposing a driving torque on a wheel.

The present invention also relates to methods of testing tires.

2. Description of Related Art

For information, the longitudinal coefficient of friction $\mu$ of the tire is the quotient of the longitudinal force divided by the vertical force applied, that is to say the load applied on the tire (in the simplified case of a pure braking force, and a person skilled in the art will easily know how to apply this more generally); the slip G on the tire is G=0% when there is no slip between the speed of the tire and the speed of the vehicle, that is to say if the tire is rolling freely, and G=100% if the tire is locked rotationally. Typically, according to the environment (the nature of the ground (asphalt, concrete), dry or wet (height of water), temperature and level of wear on the tire), the value of $\mu$ as a function of the slip G and the nature of the ground may vary enormously ($\mu_{max}$ equals approximately 0.15 on ice and approximately 1.2 on dry ground).

It is known that the braking of the vehicle will be all the more effective when it is managed to make the tread function at a slip G corresponding to the maximum value of the coefficient of friction (sometimes also referred to as the coefficient of adherence). The maximum value of the coefficient of friction is termed $\mu_{max}$. However, the average driver is not capable of tuning out the braking so as to satisfy this condition.

This is why vehicle stability control systems have been developed, automatically modulating the braking force so as to aim at a predetermined slip target, deemed to correspond to the maximum of the coefficient of friction.

In particular, U.S. Patent Application Publication No. 2004/0032165 A1, published Feb. 19, 2004, and which is incorporated herein by reference in its entirety, proposes a method of regulating the slip using a quantity called the "Invariant", which the research of the inventors made possible to discover, this quantity being called like this because it is substantially constant whatever the tire in question and whatever the adhesion of the ground on which the tire is rolling.

Also, through U.S. Patent Application Publication No. 2004/0024514, published Feb. 5, 2004, and which is incorporated herein in its entirety, a method of regulating slip using the same quantity called the "Invariant", has been proposed.

Though this method makes it possible to determine a slip target which is actually much closer to the real maximum coefficient of friction of the tire under actual rolling conditions, there do however exist cases where it is possible to determine an even better target for improving the effectiveness of the braking (or of the acceleration).

SUMMARY OF THE INVENTION

The invention proposes an algorithm referred to as the "Wet" algorithm for predicting an ideal target for a parameter which is controlled in a system controlling the stability of a vehicle or in a method for testing a tire.

In a general formulation, the invention proposes a vehicle stability control system in which a characteristic parameter Q of the functioning of a tire of the vehicle intended to roll on the ground varies as a function of a parameter P according to a particular law, an optimum value of the parameter P being imposed by a controller directly or indirectly so as to act on at least one of the elements chosen from the group comprising the rotation torque applied to the tire, the steering angle of the tire, the camber angle of the tire and the vertical force applied to the tire, in which the controller comprises means for:

as the values of $P_i$ are acquired, calculating the variation in P with respect to time, as long as the variation is above a low threshold, calculating coefficients $A_{[wet, p]}$ by direct calculation or by an appropriate regression so as to model the variation in P with respect to time by a variation curve which is a function of $(P_i, A_{[wet, p]})$, as soon as the variation is above a high threshold, determining a target slip $p^{Cwet}$ using at least the last values of $A_{[wet, p]}$.

The result sought is to maintain the value of a parameter Q at a value chosen as being ideal in the situation of the vehicle at the time. In the present document, a detailed description is given of an application to the control of the slip of a tire, typically during a braking maneuver or during a maneuver acting on the yawing of a vehicle (a function known by the term ABS in the first case or a function known by the name ESP in the second case). Finally, an application is mentioned aimed at controlling the path using actuators other than those acting on the torque at the wheels.

In a first application, the invention therefore proposes a vehicle (10) stability control system in which the parameter P is the slip G on the tire (12) and the characteristic parameter Q is the coefficient of friction $\mu$ of the tire, the system comprising means for imparting a longitudinal force to the tire (14), means of modulating the longitudinal force (16) and means for calculating the slip parameter $G^{Opt}$ at each activation of the means for imparting a longitudinal force to the tire in the following manner:

as the values of $G_i$ are acquired, calculating the variation in G with respect to time, as long as the variation is above a low threshold, calculating coefficients $A_{[wet,p]}$ by direct calculation or by an appropriate regression so as to model the variation in G with respect to time by a variation curve which is a function of $(G_i, A_{[wet,p]})$, as soon as the variation is above a high threshold, determining a target slip $G^{Cwet}$ using at least the last values of $A_{[wet,p]}$.

The application of choice of the present invention lies in the control of the slipping of a wheel in braking, for the purpose of making the tire function at the level where the coefficient of friction is at a maximum. The entire following description in this case concerns a device for modulating the longitudinal force which acts on the braking control (18). It should be indicated once and for all that, in this case, the operations indicated above, and in more detail below, are initialized (i=0) at each start of a braking maneuver. However, if it is decided to apply the present invention to the control of the slipping of a wheel in acceleration, the device modulating the longitudinal force acts on the driving torque at the wheels and the operations indicated at each request for a variation in the driving torque greater than a predetermined torque threshold are initialized (i=0).

It should also be noted that, in the context of the present invention, it is of little importance whether the tread whose adhesion characteristic is processed is that of a pneumatic tire or a non-pneumatic elastic solid tire or a track. The terms "tread", "tire" or "pneumatic tire", "solid tire", "elastic tire", "track" or even "wheel" must be interpreted as equivalent. It should also be noted that the determination of the values of the coefficient of friction $\mu_i$ for each slip $G_i$ may be carried out by direct measurement or by estimation from other measurements or from the estimation of other quantities such as the force in the plane of the ground and the vertical load.

Similarly, in another aspect of the invention, the invention proposes a tire testing system in which a characteristic parameter Q of the functioning of a tire intended to roll on the ground varies as a function of a parameter P according to a particular law, an optimum value of the parameter P being imposed by a controller directly or indirectly so as to act on at least one of the elements chosen from the group comprising the rotation torque applied to the tire, the steering angle of the tire, the camber angle of the tire and the vertical force applied to the tire, in which the controller comprises means for:

as the values of $P_i$ are acquired, calculating the variation in P with respect to time, as long as the variation is above a low threshold, calculating coefficients $A_{[wet,p]}$ by direct calculation or by an appropriate regression so as to model the variation in P with respect to time by a variation curve which is a function of ($P_i, A_{[wet, p]}$), as soon as the variation is above a high threshold, determining a target slip $P^{Cwet}$ using at least the last values of $A_{[wet, p]}$.

The result sought is to maintain the value of a parameter Q at a value chosen according to the objective of the test. In the present document, an application to the control of the slip of a tire, typically during a braking maneuver, is described in detail. Finally, an application is mentioned aimed at controlling the drift of the tire.

The invention proposes a system for testing a tire, in which the parameter P is the slipping G of the tire and the characteristic parameter Q is the coefficient of friction $\mu$ of the tire, using means for imparting a longitudinal force to a tire intended to roll on the ground, means of modulating the longitudinal force using at least one "target slip" parameter which is the slip sought in the rotation of the tire on the ground, and means for calculating the slip parameter $G^{Opt}$ at each activation of the means for imparting a longitudinal force to the tire, for successive levels "i" of the longitudinal force each corresponding to a slip $G_i$, in the following manner:

as the values of $G_i$ are acquired, calculating the variation in G with respect to time, as long as the variation is above a low threshold, calculating coefficients $A_{[wet,p]}$ by direct calculation or by an appropriate regression so as to model the variation in G with respect to time by a variation curve which is a function of ($G_i, A_{[wet, p]}$), as soon as the variation is above a high threshold, determining a target slip $G^{Cwet}$ using at least the last values of $A_{[wet, p]}$.

The application of choice of the present invention lies in the control of the slipping of a wheel in braking on a machine or test vehicle. The entire following description in this case concerns a device for modulating the longitudinal force which acts on the braking control. It should be indicated once and for all that, in this case, the operations indicated above, and in more detail below, are initialized (i=0) at each start of a braking maneuver. However, if it is decided to apply the present invention to the control of the slipping of a wheel in acceleration, the device modulating the longitudinal force acts on the driving torque at the wheels and the operations indicated at each request for a variation in the driving torque greater than a predetermined torque threshold are initialized (i=0).

It should also be noted that, in the context of the present invention, it is of little importance whether the tread whose adhesion characteristic is processed is that of a pneumatic tire or a non-pneumatic elastic solid tire or a track. The terms "tread", "tire" or "pneumatic tire", "solid tire", "elastic tire", "track" or even "wheel" must be interpreted as equivalent. It should also be noted that the determination of the values of the coefficient of friction $\mu_i$ for each slip $G_i$ may be carried out by direct measurement or by estimation from other measurements or from the estimation of other quantities such as the force in the plane of the ground and the vertical load.

DESCRIPTION OF THE PREFERRED EMBODIMENTS

Figure 1:
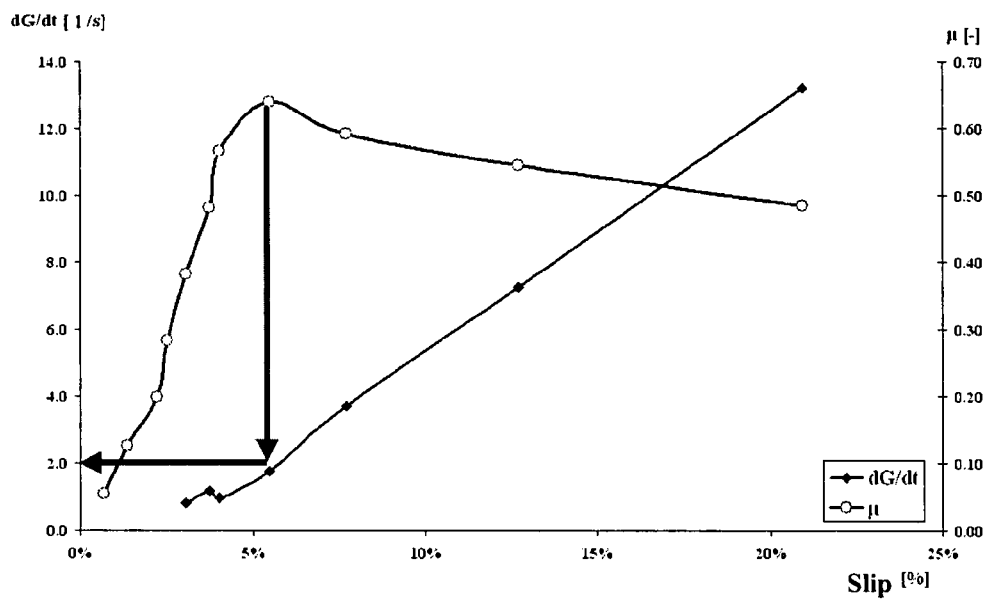
FIG. 1 illustrates the Wet algorithm.

As its name indicates, this algorithm is particularly designed for calculating a target on wet ground (in fact all types of ground with low adhesion). This is because, on this type of ground, the wheel locks very quickly and there is a risk of perceiving too late that the maximum of the curve $\mu(G)$, as shown in FIG. 1, has been exceeded.

The principle of this algorithm consists of studying the change in the derivative of the slip as a function of time dG/dt. If an excessively rapid change is noted, that is to say in fact an excessively rapid change in the slip, it can be presumed that the system is no longer stable, since the slip corresponding to the maximum adhesion has been or is about to be exceeded.

The algorithm is preferably used only with slip values above 4%. Advantageously, the low threshold is around 100% per second and the second high threshold is around 300% per second.

A simple application of this algorithm uses a linear regression, which means that coefficients $A_{wet}$ and $B_{wet}$ are calculated in the following manner:

$$\frac{dG}{dt} = A^{WET} \cdot G + B^{WET}$$

and the target slip $G^{Cwet}$ is therefore determined as follows:

$$G^{Cwet} = \frac{dG\_tgt - B^{WET}}{A^{WET}}.$$

Although an experimental value of 200% per second for the parameter "dG_tgt" has given good results, it is possible in practice to use this parameter arbitrarily as a fine-tuning button for the practical functioning of the vehicle stability control system, just as mentioned with regard to the β and Invariant parameters.

Figure 2:
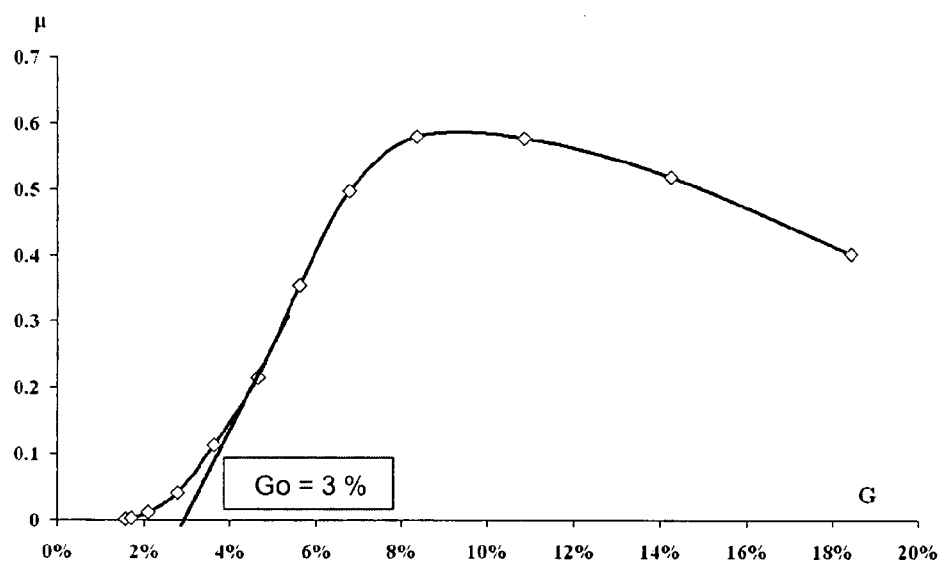
FIG. 2 illustrates a particular processing of the first acquisitions of measurements or estimations.
Figure 3:
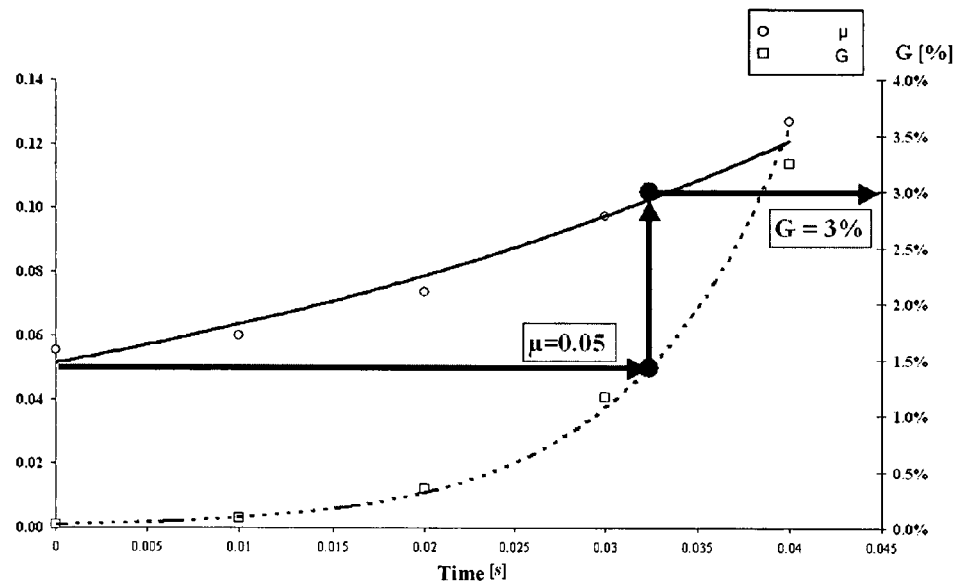
FIG. 3 illustrates the particular processing in more detail.

A few corrections are proposed below to the low slip and coefficient of friction values obtained at the very start of a braking maneuver. At the start of braking, it has been found that the curve μ(G) can have a strange behavior. The purpose of this first part of the algorithm is to correct this behavior. In FIGS. 2 and 3, it can be seen that, on wet ground, the foot of the curve μ(G) does not seem to be linear and that, for a zero a, the slip is not. This is probably due to errors in the value of the slip measured. This is obviously not representative of the physical phenomena in the contact of the tread on the ground. This is a nuisance for the target slip calculation algorithms, which are based on the study of the slope of the curve μ(G). Naturally, this is very dependent on the concrete technological means used on the vehicle for acquiring this information. Consequently, the indications supplied in this context are simple suggestions which it is useful to apply if dealing with this problem, but which are not limiting. More generally, it is useful to correct authoritatively the shape of the foot of the variation curve of the coefficient of friction as a function of the slip if it has a very implausible trend.

The first part of the processing of the data will therefore consist of calculating the value of the slip from which it is possible to use the data for reliably calculating a target slip or the optimum slip. Let this slip be called $G_0$. FIG. 2 shows that this slip $G_0$ is equal to approximately 3%. A more plausible trend of the curve μ(G) is obtained by linking $G_0$ to the substantially linear part of the increasing part of the curve.

Consequently the vehicle stability control system is preferably such that, before all the operations using the curve of variation of $\mu_i$ as a function of $G_i$, a correction is carried out of the start of the curve by eliminating the first real pairs $(\mu_i, G_i)$ as long as the variation in $\mu_i$ as a function of $G_i$ is not substantially constant and seeking the slip $G_0$ associated with a zero coefficient of friction (this is of course not limiting) such that the pair $(0, G_0)$ and the non-eliminated pairs $(\mu_i, G_i)$ are substantially aligned, and using a curve starting from $(0, G_0)$ and joining the non-eliminated pairs $(\mu_i, G_i)$, so that, for any value of $G_i$ greater than $G_0$, $G_i$ is replaced by $G_i$-$G_0$.

For this, for example, an algorithm is used which comprises the following steps:
- systematically eliminating all the values of the slip associated with a coefficient of friction of less than 0.01;
- continuously calculating regressions of μ and G as a function of time, preferably exponential regressions having regard to the trend of the foot of the curve in the example illustrated by means of FIG. 2 and FIG. 3:

$$\mu = e^{A^{\mu}(t-T^{Start})+B^{\mu}}, G = e^{A^G(t-T^{Start})+B^G}$$

It can be considered that the acquired values represent reality when the estimated or measured coefficient of friction is greater than 0.1 or when the slip exceeds 4%.

FIG. 3 illustrates the way of determining $G_0$ from curves giving the values acquired respectively for the coefficient of friction as a function of time and for the slip as a function of time. The value of the time for which the regression of the curve of μ is equal to a certain value, for example 0.05 (see the horizontal segment between a zero X-axis value and a Y-axis value equal to 0.05 and the dotted-line curve), is sought. The value of $G_0$ will be the value of the regression on the curve of the slip at this moment (see the vertical segment between the point previously obtained and a point on the curve in a continuous line, giving the value of the slip $G_0$).

Therefore, before all the operations using the curve of variation of $\mu_i$ as a function of $G_i$, a correction is carried out of the start of the curve by eliminating the first real pairs $(\mu_i, G_i)$ as long as the variation in $\mu_i$ as a function of $G_i$ is not substantially constant and finding the slip $G_0$ associated with a zero coefficient of friction such that the pair $(0, G_0)$ and the non-eliminated pairs $(\mu_i, G_0)$ are substantially aligned, and using a curve starting from $(0, G_0)$ and joining the non-eliminated pairs $(\mu_i, G_i)$. Next, in all the algorithms used, for any value of $G_i$ greater than $G_0$, $G_i$ is replaced by $G_i$-$G_0$.

Figure 4:
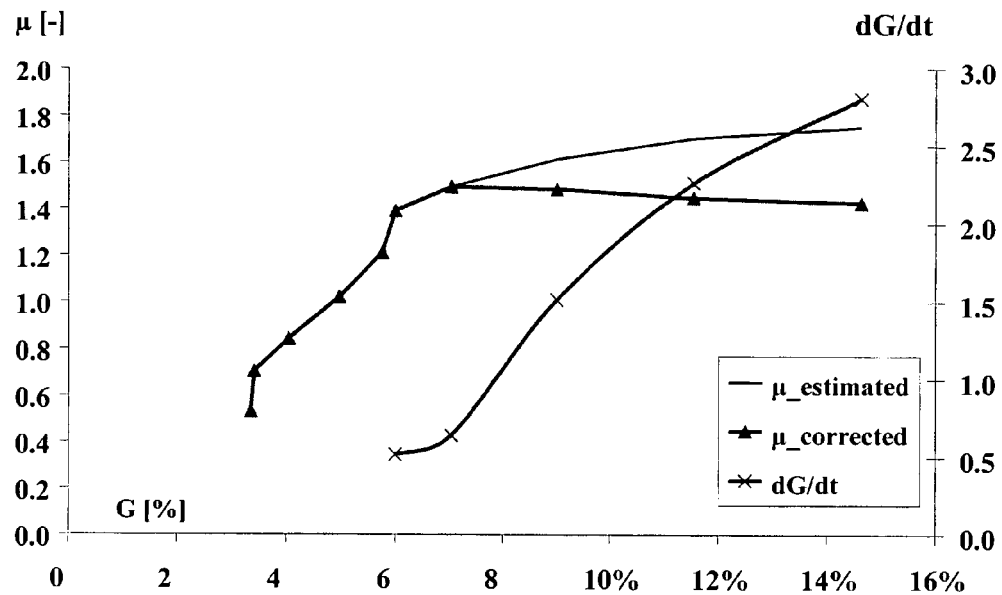
FIG. 4 illustrates another particular processing of the acquisitions of measurements or estimations.
Figure 5:
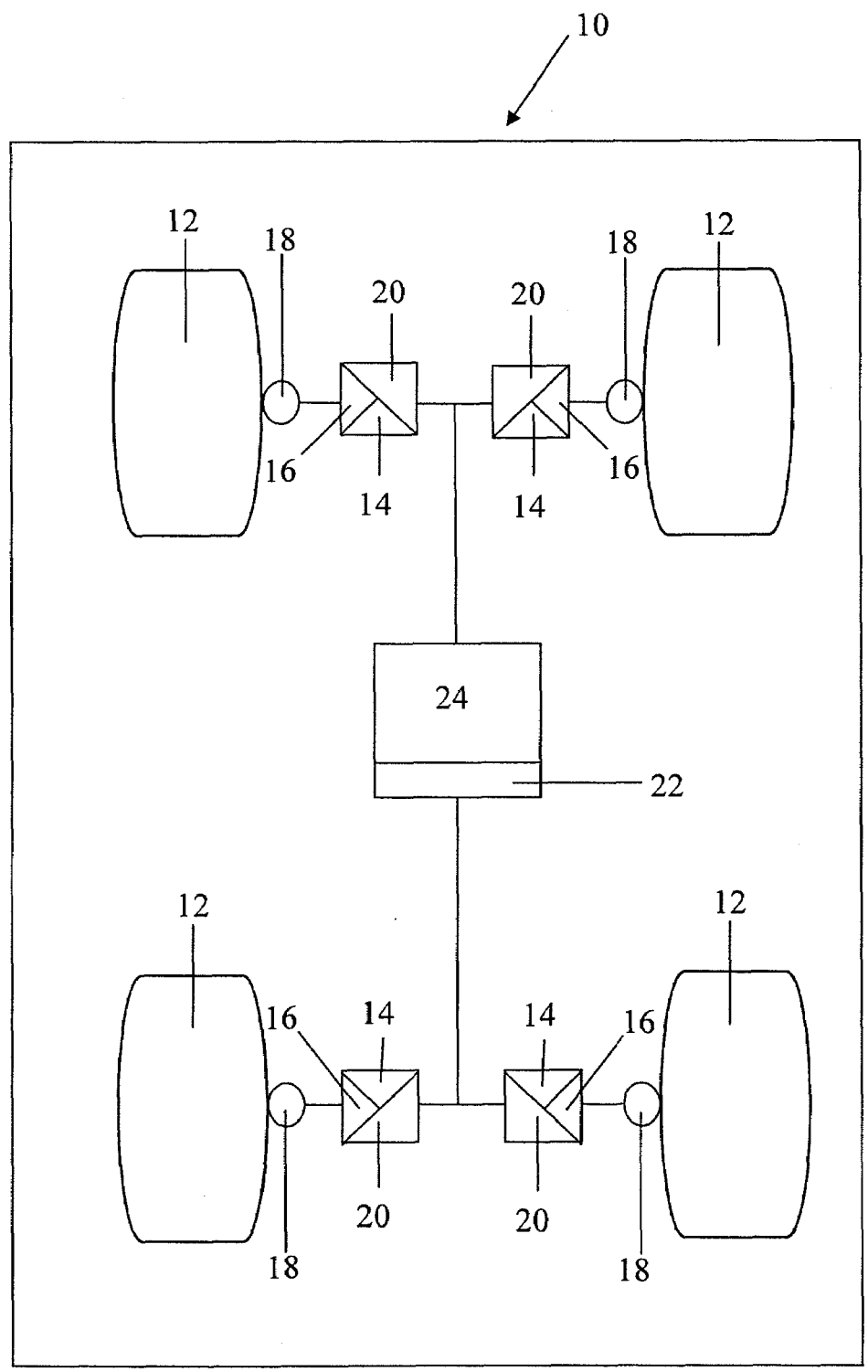
FIG. 5 is a diagrammatic representation of a passenger vehicle having a system for controlling the stability of the vehicle.

Up till now it has been assumed that values of μ have been calculated or estimated. However, in certain cases, the method of obtaining the coefficient of friction (from the braking force itself estimated on the basis of the braking pressure having regard to the particular characteristics of each vehicle—or the braking system of a tire test bench—and from the speed of the wheel) does not give a satisfactory result (the curve μ(G) calculated is too flat or continuously ascending). It is known that this is not realistic. To correct this problem, a numerical correction of the μ calculated can be introduced. This correction is based on the rate of change of the slip as a function of time. This is because, if the speed of the wheel (and therefore the slip) takes off quickly, it is because the unstable zone of the curve μ(G) is involved. Therefore the curve μ(G) should decrease, which is taken advantage of as follows:

$$\mu_i^{Corr} = \mu_i^{acquired} \cdot \left[\text{Max}\left(\frac{dG}{dt}; 1\right)\right]^{-ACorr}$$

where "Acorr" is a fine-tuning coefficient and can be specific to each algorithm. For example, a good practical value has proved to be 0.2 for the "Average" algorithm. FIG. 4 illustrates this correction. By virtue of this correction, the curve μ(G) regains a shape certainly more in accordance with physical reality, which enables the algorithms to produce reliable targets.

It should be noted that, if the value of $\mu_{max}$ is in itself modified by this correction, all the algorithms used are based on the shape of the curve rather than its values. The reader is also referred to the aforementioned patent application (U.S. Patent Application Publication No. 2004/0032165 A1) where the fact is brought out that the "Invariant" algorithm makes it possible to calculate a slip target without even calculating the exact value of the associated coefficient of friction, the latter being unnecessary to the correct functioning of the slip control of a vehicle wheel.

In the aforementioned patent applications, the possibility of other applications of the "Invariant" algorithm was demonstrated, for example to the analysis of the drift thrust developed by a pneumatic tire or elastic solid tire in an operating zone close to the saturation of the drift thrust. It is because of the similarity in the variation laws of these physical phenomena. In the same way, the present invention has broader applications than the control of slip in a vehicle stability control system or than controlling the slip during a test on the tire. In order to close the subject, let us simply cite (without even this addition being limiting, as will have been understood) that the invention also applies to a vehicle stability control system aimed at predicting the value of the drift angle $\delta$ of a pneumatic tire where the lateral force (also referred to as the "drift thrust") is at a maximum and also that the invention applies to a tire testing system aimed at predicting the value of the drift angle $\delta$ of a pneumatic tire where the lateral force (also referred to as the "drift thrust") is at a maximum. It is a case of predicting when the tire will reach its maximum and therefore will no longer be capable of maintaining the drift thrust, in order to be able to maintain the functioning of the tire at a predetermined value of the drift thrust $F^{det}$. In order to maintain the functioning of the tire at a predetermined value, it is there also useful to estimate a target for the drift angle by means of a "Wet" algorithm.

In this case, the parameter P is the drift angle $\delta$ of the tire and the characteristic parameter Q is the drift thrust $F^{det}$ of the tire. It is a case of predicting when the tire will reach its maximum and therefore will no longer be capable of meeting its prime function, which is to enable the vehicle to turn, in order to be able to maintain the functioning of the tire at a predetermined value of the drift thrust $F^{det}$, or to warn the driver. To maintain the functioning of the tire at a predetermined target value, it is possible to carry out, possibly automatically, preventive interventions for reducing the speed of the vehicle in order to avoid critical driving situations (if the vehicle is not running as the driver wishes, an accident may result there from). In order to carry out these actions advisedly, it is therefore also useful to make a selection between several target values given by various algorithms.

In the application to vehicle dynamic management systems, the invention concerns a vehicle stability control system in which the parameter P is the drift angle $\delta$ of the tire and the characteristic parameter Q is the drift thrust $F^{det}$ of the tire, the system comprising means for controlling a parameter "ξ" (20) according to instructions entered by the driver of the vehicle on his control means and according to instructions delivered by a path controller (22), means of modulating the parameter "ξ" and means for calculating the angle of drift parameter $\delta^{Opt}$ whenever means are activated for entering the parameter "ξ" in the following manner:

as the values of $\delta_i$ are acquired, calculating the variation in $\delta$ with respect to time, as long as the variation is above a low threshold, calculating coefficients $A_{[wet,p]}$ by direct calculation or by an appropriate regression so as to model the variation in P with respect to time by a variation curve which is a function of $(\delta_i, A_{[wet,p]})$, as soon as the variation is above a high threshold, determining a target slip $\delta^{Cwet}$ using at least the last values of $A_{[wet,p]}$.

In the application to tires testing, the invention concerns a system for the slip testing of a tire, using means for imparting a drift angle to a tire under test on the ground, the means being equipped with a system of controlling a parameter "ξ" according to instructions coming from a test control means, and according to instructions delivered by a controller (24) aimed at maintaining the functioning of the tire as a predetermined value of the drift thrust $F^{det}$, the controller using at least one optimum value $\delta^{Opt}$ of the drift angle corresponding to the maximum value of the drift thrust $F^{det}$, the controller comprising means for performing the following operations:

as the values of $\delta_i$ are acquired, calculating the variation in $\delta$ with respect to time, as long as the variation is above a low threshold, calculating coefficients $A_{[wet,p]}$ by direct calculation or by an appropriate regression so as to model the variation in P with respect to time by a variation curve which is a function of $(\delta_i, A_{[wet,p]})$, as soon as the variation is above a high threshold, determining a target slip $\delta^{Cwet}$ using at least the last values of $A_{[wet,p]}$.

What is claimed is:

1. A vehicle stability control system in which a characteristic parameter Q of a functioning of a tire of the vehicle intended to roll on the ground varies as a function of a parameter P according to a certain law, an optimum value of the parameter P being imposed by a controller directly or indirectly, so as to act on at least one of elements selected from the group consisting of a rotation torque applied to the tire, a steering angle of the tire, a camber angle of the tire and a vertical force applied to the tire, in which the controller comprises means for:

as values of $P_i$ are acquired, calculating a variation in P with respect to time, as long as the variation is above a low threshold, calculating coefficients $A_{[wet,p]}$ by direct calculation or by a regression, so as to model the variation in P with respect to time by a variation curve which is a function of $(P_i, A_{[wet,p]})$, and if the variation is above a high threshold, determining a target slip $P^{Cwet}$ using values of $A_{[wet,p]}$.

2. A vehicle stability control system according to claim 1, in which the parameter P is a drift angle $\delta$ of the tire and the characteristic parameter Q is a drift thrust $F^{det}$ of the tire, the system comprising means for controlling a parameter "ξ" according to instructions entered by a driver of the vehicle on a control means and according to instructions delivered by a path controller, means of modulating the parameter "ξ" and means for calculating the drift angle parameter $\delta^{Opt}$ at each activation of the means for entering the parameter "δ" in the following manner:

as values of $\delta_i$ are acquired, calculating variation in $\delta$ with respect to time, as long as the variation is above a low threshold, calculating coefficients $A_{[wet,p]}$ by direct calculation or by a regression, so as to model the variation in $\delta$ with respect to time by a variation curve which is a function of $(\delta_i, A_{[wet,p]})$, if the variation is above a high threshold, determining a target slip $\delta^{Cwet}$ using values of $A_{[wet,p]}$.

3. A vehicle stability control system, in which a parameter G is a slip of a tire and a characteristic parameter $\mu$ is a coefficient of friction of the tire, the system comprising means for imparting a longitudinal force to the tire, means of modulating the longitudinal force and means for calculating an optimal slip parameter $G^{Opt}$ at each activation of the means for imparting a longitudinal force to the tire in the following manner:

as values of $G_i$ are acquired, calculating a variation in G with respect to time, as long as the variation is above a low threshold, calculating coefficients $A_{[wet, p]}$ by direct calculation or by a regression, so as to model the variation in G with respect to time by a variation curve which is a function of $(G_i, A_{[wet, p]})$, and if the variation is above a high threshold, determining a target slip $G^{Cwet}$ values using values of $A_{[wet, p]}$.

4. The vehicle stability control system according to claim 3, in which a linear regression is used and coefficients $A_{wet}$ and $B_{wet}$ are calculated in the following manner:

$$\frac{dG}{dt} = A^{WET} \cdot G + B^{WET}$$

and the target slip $G^{Cwet}$ is therefore determined as follows:

$$G^{Cwet} = \frac{dG\_tgt - B^{WET}}{A^{WET}}.$$

5. The vehicle stability control system according to claim 4, in which "dG_tgt" is used as a fine-tuning parameter.

6. The vehicle stability control system according to claim 3, in which the means for modulating the longitudinal force acts on a braking control and is initialized (with i=0) at a start of each braking control operation.

7. The vehicle stability control system according to claim 3, in which the means for modulating the longitudinal force acts on a driving torque at the wheels and is initialized (with i=0) at each request for a variation in the driving torque above a predetermined torque threshold.

8. The vehicle stability control system according to claim 3, in which, before obtaining the target values of the slip using a curve comprising determined values of $\mu_i$ as a function of $G_i$, a correction of a start of the curve is carried out by:

eliminating from the curve at least a first real pair of values $(\mu_i, G_i)$, as long as the variation in $\mu_i$ as a function of $G_i$ is not substantially constant, seeking the slip $G_0$ associated with a zero coefficient of friction, such that the pair $(0, G_0)$ and non-eliminated pairs $(\mu_i, G_i)$ are substantially aligned, and using a curve starting from $(0, G_0)$ and joining the non-eliminated pairs $(\mu_i, G_i)$, so that, for any value of $G_i$ greater than $G_0$, $G_i$ is replaced by $G_i - G_0$.

9. The vehicle stability control system according to claim 3, in which, when the variation in the slip with respect to time becomes greater than a predetermined variation threshold, before obtaining the target values for the slip using a curve comprising determined values of $\mu_i$ as a function of $G_i$, a correction to the end of the curve is carried out, by replacing the values of $\mu_i$ corresponding to the values of slip that result in the variation in the slip with respect to time being beyond the predetermined variation threshold, by corrected values as follows:

$$\mu_i^{Corr} = \mu_i \cdot \left[\text{Max}\left(\frac{dG}{dt}; 1\right)\right]^{-ACorr}$$

where "Acorr" is a preset parameter.

10. The vehicle stability control system according to claim 9, in which "Acorr" is equal to approximately 0.2.

11. The vehicle stability control system according to claim 9, in which "Acorr" is used as a fine-tuning parameter.

* * * * *